United States Patent
Sancheti et al.

(10) Patent No.: US 11,948,095 B2
(45) Date of Patent: Apr. 2, 2024

(54) METHOD AND SYSTEM FOR RECOMMENDING DIGITAL CONTENT

(71) Applicant: ADOBE INC., San Jose, CA (US)

(72) Inventors: Abhilasha Sancheti, College Park, MD (US); Zheng Wen, Mountain View, CA (US); Iftikhar Ahamath Burhanuddin, Karnataka (IN)

(73) Assignee: ADOBE INC., San Jose, CA (US)

( * ) Notice: Subject to any disclaimer, the term of this patent is extended or adjusted under 35 U.S.C. 154(b) by 1168 days.

(21) Appl. No.: 16/691,158

(22) Filed: Nov. 21, 2019

(65) Prior Publication Data

US 2021/0158177 A1 May 27, 2021

(51) Int. Cl.
G06N 5/04 (2023.01)
G06N 7/01 (2023.01)
G06N 20/00 (2019.01)

(52) U.S. Cl.
CPC .................. *G06N 5/04* (2013.01); *G06N 7/01* (2023.01); *G06N 20/00* (2019.01)

(58) Field of Classification Search
CPC ............ G06N 5/04; G06N 5/02; G06N 5/022; G06N 5/00; G06N 7/00; G06N 7/005; G06N 20/00; G06N 20/10; G06N 20/20
See application file for complete search history.

(56) References Cited

U.S. PATENT DOCUMENTS

2019/0164069 A1* 5/2019 Zhivotvorev .......... G06N 20/00

OTHER PUBLICATIONS

Guo et al. "Merging trust in collaborative filtering to alleviate data sparsity and cold start", 2013 https://www.sciencedirect.com/science/article/pii/S0950705113003870 (Year: 2013).*
Felicio et al. "Multi-Armed Bandits to Recommend for Cold-Start User", 2016 https://www.researchgate.net/profile/Klerisson-Paixao/publication/317952916_Multi-Armed_Bandits_to_Recommend_for_Cold-Start_User/links/5952bff6a6fdcc218d281104/Multi-Armed-Bandits-to-Recommend-for-Cold-Start-User.pdf (Year: 2016).*
Zeng et al. "Online Context-Aware Recommendation with Time Varying Multi-Armed Bandit", 2016 https://dl.acm.org/doi/pdf/10.1145/2939672.2939878 (Year: 2016).*
Jiahui Liu, Peter Dolan, and Elin Rønby Pedersen. 2010. "Personalized News Recommendation Based on Click Behavior", In Proceedings of the 15th International Conference on Intelligent User Interfaces. ACM. 31-40.
Francesco Ricci and Barry Smyth. 2002. "Recommendation and Personalization in eCommerce", In Proc. Adaptive Hypermedia 2002 Workshop.

(Continued)

*Primary Examiner* — Alan Chen
(74) *Attorney, Agent, or Firm* — F. Chau & Associates, LLC

(57) ABSTRACT

A method for recommending digital content includes: determining user preferences and a time horizon of a given user; determining a group for the given user based on the determined user preferences; determining a number of users of the determined group and a similarity of the users; applying information including the number of users, the similarity, and the time horizon to a model selection classifier to select one of a personalized model of the user and a group model of the determined group; and running the selected model to determine digital content to recommend.

20 Claims, 5 Drawing Sheets

(56) References Cited

OTHER PUBLICATIONS

James Davidson, Benjamin Liebald, Junning Liu, Palash Nandy, Taylor Van Vleet, Ullas Gargi, Sujoy Gupta, Yu He, Mike Lambert, Blake Livingston, et al. 2010. "The YouTube Video Recommendation System", In Proceedings of the Fourth ACM Conference on Recommendation Systems. ACM, 293-296.
James Bennett, Stan Lanning, et al. 2007. "The Netflix Prize", In Proceedings of KDD Cup and Workshop, vol. 2007. New York, NY, USA., 35.
Jesús Bobadilla, Fernando Ortega, Antonio Hernando, and Jesús Bernal. 2012. "A collaborative filtering approach to mitigate the new user cold start problem", Knowledge-Based Systems 26 (2012), 225-238.
Crícia Z Felício, Klérisson VR Paixão, Cella AZ Barcelos, and Philippe Preux. 2017. "A Multi-Armed Bandit Model Selection for Cold-Start User Recommendation". In Proceedings of the 25th Conference on User Modeling, Adaptation and Personalization. ACM, 32-40.
Yisong Yue and Carlos Guestrin. 2011. "Linear Submodular Bandits and their Application to Diversified Retrieval", In Advances in Neural Information Processing Systems. 2483-2491.
Lihong Li, Wei Chu, John Langford, and Robert E Schapire. 2010. "A Contextual-Bandit Approach to Personalized News Article Recommendation". In Proceedings of the 19th International Conference on World Wide Web. ACM, 661-670.

\* cited by examiner

1: Inputs: Set of L items $\mathcal{E}$; Dimension of feature space $d$; Noise variance estimate $\sigma^2$; Confidence radius factor $\alpha$; $U(t)$ returning user at time $t$ for the group model and $U(t) = u$ for the personalized model
2: $M_0 \leftarrow I_d$, $B_0 \leftarrow 0$      // Initialization
3: for $t = 1, \ldots, n$ do
4:    $\theta_{t-1} \leftarrow \sigma^2 M_{t-1}^{-1} B_{t-1}$      // Regression estimate of $\theta_*$
     // Recommend K items to user $U(t)$ and get feedback
5:    for $k = 1, \ldots, K$ do
6:      $a_t^k \leftarrow \underset{a \in \mathcal{E} \setminus \{a_t^1, \ldots, a_t^{k-1}\}}{\arg\max} \left[ x_a^T \theta_{t-1} + \alpha \sqrt{x_a^T M_{t-1}^{-1} x_a} \right]$
7: Choose $A_t \leftarrow (a_t^1, \ldots, a_t^K)$, observe clicks $C_t \subseteq \{1, \ldots, K\}$
     // Update statistics
8:    for $k = 1, \ldots, K$ do
9:      $M_t \leftarrow M_{t-1} + \sigma^{-2} x_{a_t^k} x_{a_t^k}^T$ and $B_t \leftarrow B_{t-1} + x_{a_t^k} \cdot \mathbb{1}\{k \in C_t\}$

FIG. 4

METHOD AND SYSTEM FOR RECOMMENDING DIGITAL CONTENT

1. Technical Field

This disclosure relates generally to recommendation systems, and more particularly to a method and system for recommending digital content when there is limited user information.

2. Discussion of Related Art

Recommendation systems may be used to form recommendations to guide user interaction and navigation with digital content via a computing device. Examples of such recommendations include which article to read, which advertisement to include in a webpage, and which digital movie to view. Users have varied preferences and thus recommending the same item to every user may not cater to the specific needs of some users. Hence, personalization plays an important role in modern recommendation systems.

Personalized recommendations can be effective in many applications if the available dataset of user behavior is sufficient for accurate personalized modelling. However, when there have been few interactions (i.e., in the cold-start setting), a recommendation system may not have sufficient data to learn, and may suffer from limitations including sparsity and accuracy. A personalized recommendation strategy produced from inaccurate personalized modeling is likely ineffectual and may discourage instead of promote user interaction.

SUMMARY

Embodiments of the disclosure provide techniques for recommending content to a user even when information about the user is limited.

An exemplary embodiment of the present disclosure provides a computer-implemented method for recommending digital content. The method includes determining user preferences and a time horizon of a given user; determining a group for the given user based on the determined user preferences; determining a number of users of the determined group and a similarity of the users; and applying information including the number of users, the similarity, and the time horizon to a model selection classifier to select one of a personalized model of the user and a group model of the determined group.

An exemplary embodiment of the present disclosure provides a training system for training a recommendation system. The training system includes a memory storing a computer program for training a learning agent and deploying the learning agent to the recommendation system; a network interface for communicating with a computer network; and a processor configured to execute the computer program. The computer program is configured to train the learning agent to select between a group model for a given user and a personalized model for the given user based on a number of users of a group associated with the given user, a similarity of the users, and a time horizon associated with the given user. The computer program is further configured to output the learning agent across the computer network to a device housing the recommendation system.

An exemplary embodiment of the present disclosure provides a computer program product for training a model selection classifier to choose between selecting a group model and a personalized model for recommending digital content. The computer program product includes instructions that cause at least one computing device to: generate a sample comprising a number of users, a similarity of the users, and a number of iterations I; simulate the number of users from a plurality of user preferences and the similarity; for each of I users of the users, simulate the corresponding user selecting a subset of items (e.g., 0 or more) from a plurality of items suggested by a simulated group model, and determine a group reward for the corresponding user based on the corresponding selection; for each of the I users, simulate the corresponding user selecting a subset of items (e.g., 0 or more) from a plurality of items suggested by a simulated personalized model, and determine a personalized reward for the corresponding user based on the corresponding selection; and label the sample with a label representative of the group model when a sum of the group rewards is greater than or equal a sum of the personalized rewards, and otherwise label the sample with a label representative of the personalized model.

BRIEF DESCRIPTION OF THE DRAWINGS

The detailed description describes one or or embodiments with additional specificity and detail through use of the accompanying drawings, briefly described below.

FIG. 4 illustrates an exemplary algorithm that may be used to update the recommendation models.

DETAILED DESCRIPTION OF EXEMPLARY EMBODIMENTS

Figure 1:
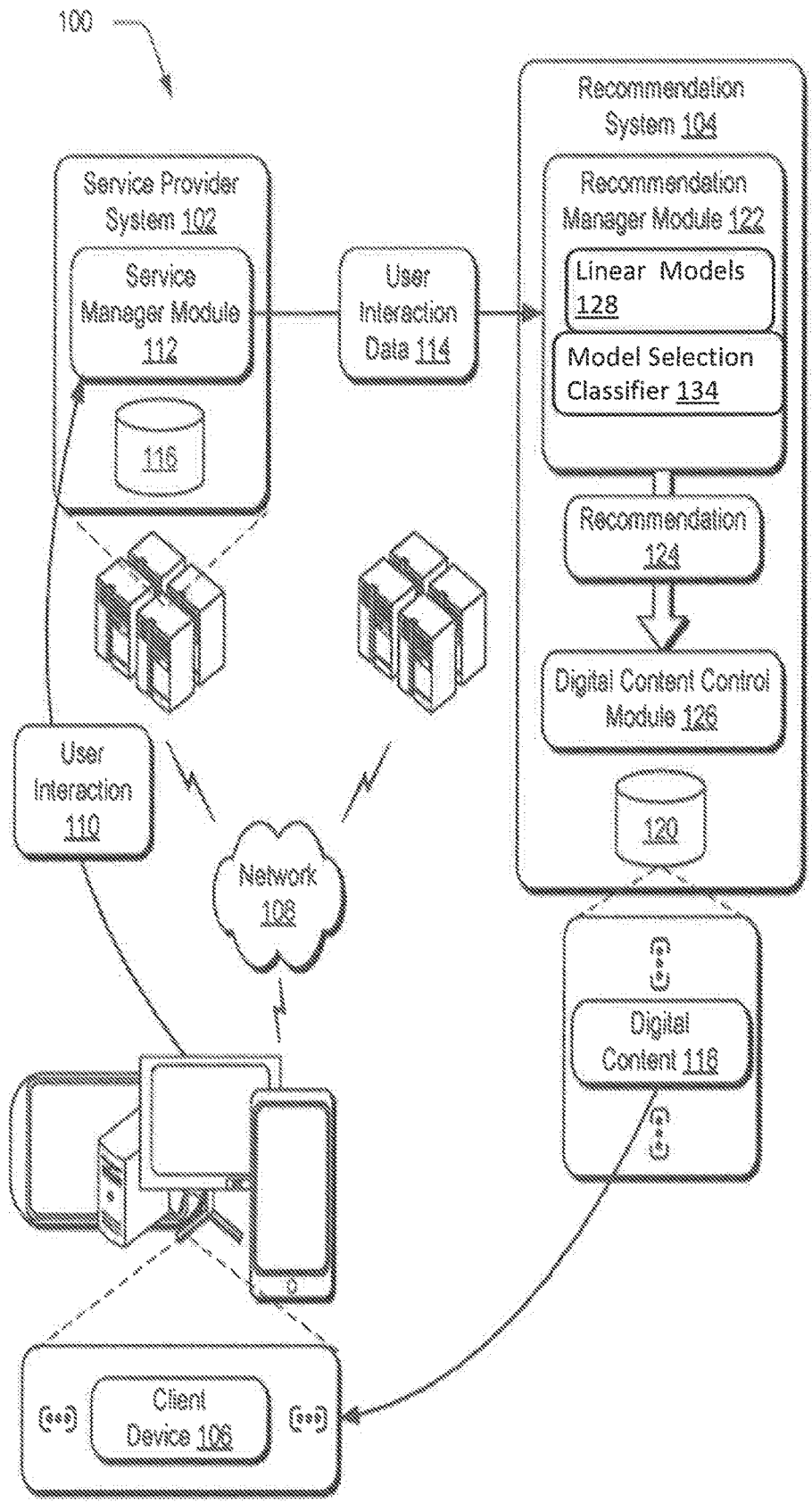
FIG. 1 illustrates a recommendation system for providing recommendations according to an exemplary embodiment of the disclosure.

Recommendation systems help users to discover new and relevant items (e.g. products, videos, music, etc.), create a better user experience, and potentially increase sales of those items. These systems typically rely on interactions of users with the items to determine the most optimal recommendations.

A personalized recommendation system that develops a personalized model for each user may be unable to provide accurate recommendations during a cold-start state (e.g., prior to receiving and processing a sufficient amount of data on each user to generate an accurate individual model of each user). A group-based recommendation system that learns across multiple users (e.g., learns across a group of similar users with the same model) may improve the recommendations in the cold-start state since more data tends to reduce the variance, but there may be biases and inaccuracies in such user behavior modeling. Further, it can be difficult to determine whether a personalized recommendation system has exited the cold-start state for a given user. Thus, practitioners manually and statically select a single recommendation system (e.g., a personalized recommendation system or a group-based recommendation system) based on their experience, which rarely results in optimal recommendations.

According to at least one embodiment of the present disclosure, the recommendation system includes a classifier that automatically selects between two types of learning models for providing recommendations to a given user based on a number of users of a group including the given user, a similarity of the users, and time horizon associated with the given user. The first model, referred to as the group model, learns a recommendation strategy for the whole user group from the feedback of all users. The second model, the personalized model, learns a personalized recommendation strategy for each user based solely on that specific user's feedback.

The following terms are used throughout the present disclosure:

The term "Digital Content" may refer to any type of data that is configured to be rendered for output by an output device of a computing device to a user. Examples of digital content include digital images, digital audio, digital media, digital video, digital articles, digital text, etc. Digital marketing content may be a type of digital content that is configured to promote conversion of a good or service, e.g., "click" on an ad, purchase of a good or service, etc.

The term "Recommendations" may refer to suggestions or proposals as to a best course of action to achieve a desired result, e.g., the "reward" in a multi-armed bandit algorithm. In a digital content context, recommendations may identify which item of digital content is likely to achieve a desired result, e.g., conversion for digital marketing content.

The term "reward" as applied to a list of items recommended to a user may indicate how many of the items were selected by the user. For example, the reward may increase as the number of selected items increases.

The term "time horizon" may indicate how familiar the recommendation system is with the user that is receiving the recommendations. For example, the time horizon of a user may have a low value if the recommendation system has never interacted with the user and a higher value if the recommendation has frequently interacted with the user.

The term "model selection classifier" may refer to an algorithm that classifies information as corresponding to one of two different learned models (e.g., a group model and a personalized model). The model selection classifier includes, but is not limited to a logistic regression (Log Reg) classifier and a support vector machine (SVM) classifier such as SVM with a linear kernel function (SVM-Linear) and SVM with a radial basis function (SVM-RBF).

The term "multi-armed bandit algorithm" may refer to an algorithm that is configured to address allocation of a fixed limited set of resources (e.g., digital content) through use of recommendations in a way to maximize the reward. In this algorithm, the recommendation system is modelled as a gambler that makes a decision regarding which slot machine in a collection of slot machines to play, how many times to play each slot machine, in which order to play the slot machines, and whether to continue with a current machine or to try a different machine. Each machine provides a random reward based on a probability distribution specific to that machine. Thus, the objective of the recommendation system as the gambler is to maximize a sum of rewards earned through a series of recommendations by identifying which machines (i.e., items of digital content) are to be subject of the user interaction.

FIG. 1 is an illustration of a digital medium environment 100 in an exemplary implementation that is operable to employ recommendation generation and digital content control techniques described herein. The illustrated environment 100 includes a service provider system 102, a recommendation system 104, and a plurality of client devices, an example of which is illustrated as client device 106. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), etc. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the recommendation system 104 and as further described in FIG. 5.

The client device 106 is illustrated as engaging in user interaction 110 with a service manager module 112 of the service provider system 102. The service provider system 102, for instance, may be configured to support user interaction with digital content 118. User interaction data 114 is then generated (e.g., by the service manager module 112) that describes this user interaction 110, which may be stored in a storage device 116.

Digital content 118 may take a variety of forms and thus user interaction 110 with the digital content 118 may also take a variety of forms. For example, a user of the client device 106 may read an article of digital content 118, view a digital video, listen to digital music, view posts and messages on a social network system, and so forth. In another example, the digital content 118 is configured as digital marketing content to cause conversion of a good or service, e.g., by "clicking" an ad, purchase of the good or service, and so forth. Digital marketing content may also take a variety of forms, such as electronic messages, email, banner ads, posts, etc. Accordingly, digital marketing content is typically employed to raise awareness and conversion of the good or service corresponding to the content. In another example, user interaction 110 and thus generation of the user interaction data 114 may also occur locally on the client device 106.

The user interaction data 114 is received by a recommendation system 104, which employs this data to control output of the digital content 118 to the client device 106. To do so, a recommendation manager module 122 generates a recommendation 124 configured to control which items of the digital content 118 are output to the client device 106, e.g., directly via the network 108 or indirectly via the service provider system 102, by the digital content control module 126. The recommendation 124, for instance, may be configured to specify one or more articles of digital content 118 to be transmitted to the client device 106 via the service provider system 102. In another example, the recommendation 124 identifies which item of digital marketing content is to be served as part of a webpage. In a further example, the recommendation 124 forms the item of digital content 118, itself, such as to recommend digital articles, the recommendation is then selectable to cause output of those articles. Although the digital content 118 is illustrated as being maintained in the storage device 120 by the recommendation system 104, this content may also be maintained and managed by the service provider system 102 or the client device 106.

The recommendation system 104 is configured to maximize an effectiveness of the digital content 118 on causing a user interaction by a user of the client device 106, i.e., a "reward." The reward, for instance, may include reading of an article, listening to a song in digital audio, watching a digital video, and conversion of digital marketing content. To do so, the recommendation manager module 122 leverages information about the user interaction data 114 and information about the digital content 118 to estimate effectiveness of each of the items of digital content 118 in achieving the desired user interaction as the "reward" for exposing the digital content 118.

In the techniques described herein, the recommendation manager module 122 employs linear models 128, which are configured to estimate a likely effect of causing the desired user interaction for the digital content 118. This estimation is based on features that represent the digital content 118 and the user interaction data 114 as a linear function in order to generate the recommendation 124. In an exemplary embodiment of the inventive concept, the linear models 128 include personalized models and group-based models.

With respect to a given user, the recommendation manager module 122 selects a personalized model from the personalized models and a group-based model from the group-based models that is appropriate for a given user and employs a model selection classifier 134 to choose one of the selected models for generating the recommendation 124.

Figure 2:
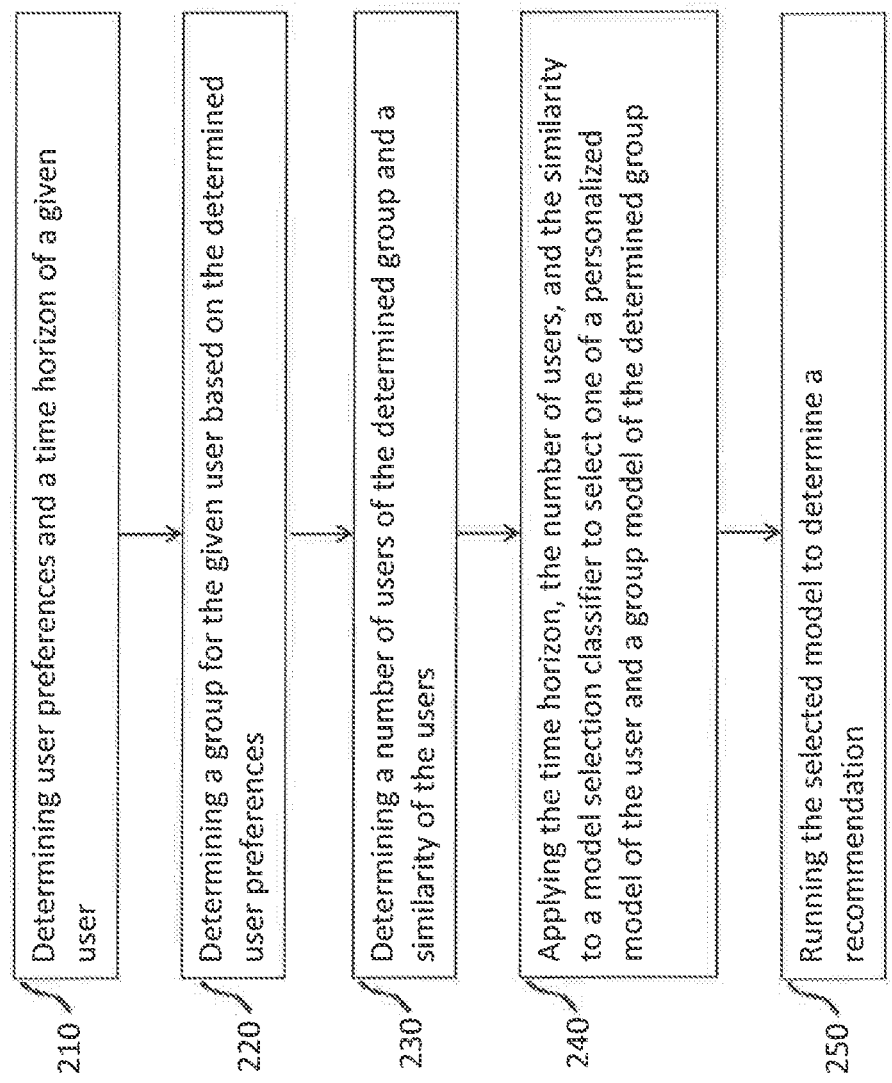
FIG. 2 illustrates a method of recommending digital content according to an exemplary embodiment of the disclosure that may be performed by the system.

FIG. 2 illustrates a method that may be used by the recommendation manager module 122 for generating the recommendation 124, according to an exemplary embodiment of the disclosure.

The method of FIG. 2 includes determining user preferences and a time horizon of a given user (step 210). As an example, the user preferences could indicate the categories (e.g., horror, sci-fi, fantasy, action, comedy, documentaries, romance, etc.) of movies the given user enjoys watching, the categories of articles (e.g., science, world news, politics, local new, etc.) the given user enjoys reading, etc. The user preferences may be determined from a user profile that is setup by the given user. For example, search engines and news applications typically allow users to create a user profile to specify topics of interest to the user. In an exemplary embodiment, the time horizon is based on the number of interactions of the given user with the recommendation system 104. For example, a user that has had many interactions with the recommendation system 104 could receive a higher time horizon than a user that has had few interactions with the recommendation system 104. In an exemplary embodiment, a value of the time horizon for a given user increases as a number of interactions of the given user with the recommendation system 104 increases. Also, a user who is predicted to have many future interactions with the recommendations system 104 could receive a higher time horizon than a user who is predicted to have fewer future interactions with the recommendation system 104.

The method of FIG. 2 further includes determining a group for the given user based on the determined user preferences (step 220). The recommendation manager module 122 may store information about a plurality of groups in the storage device 120 so it can determine which of the groups the given user corresponds. The information may be generated from user preferences of actual users. For example, a first group could be represented by a first set of the user preferences and a second group could be represented by a second set of the user preferences that differs from the first set. For example, the first set of user preferences could indicate user preferences for science fiction, horror, and fantasy, and the second set of user preferences could indicate preferences for documentaries, romance and comedies. Thus, if the user preferences of the given user include user preferences for science fiction and fantasy movies, the recommendation manager module 122 could consider the given user as being part of the first group.

The method of FIG. 2 further includes determining a number of users of the determined group and a similarity of the users (step 230). The recommendation manager module 122 may store group counts of the groups it has identified and store the user preferences of each member of the group in the storage device 120. For example, each time the recommendation manager module 122 interacts with a given unique user that it considers to be part of one of its identified groups, it can increment the count associated with the corresponding group, and store the user preferences of the given user in an entry of a list associated with the corresponding group. For example, if the first group has 9 users, upon encountering a new given user having the characteristics (e.g., user preferences) of the first group, the recommendation manager module 122 could increment the count (e.g., number of users) of the first group to 10. For example, a user preference vector derived from the user preferences of the new given user could be stored in an entry of the list associated with the first group. The recommendation manager module 122 may determine a similarity (e.g., a similarity parameter) of the users of the group associated with the given user based on the user preference vectors. For example, if the users of the group share many user preferences, the similarity parameter may indicate the users are very similar and if the users of the group do not share many user preferences, the similarity parameter may indicate that the users are not very similar. In an exemplary embodiment, the similarity parameter is calculated by taking an average of the cosine similarities between each pair of user preference vectors.

The method of FIG. 2 further includes applying the determined time horizon, the determined number of the users, and the determined similarity to a model selection classifier (e.g., 134) to select one of a personalized model of the user and a group model of the determined group (step 240). The model selection classifier 134 may operate on information including the time horizon, the number of users of the group, and a similarity parameter based on the similarity to classify the information of the given user as either corresponding to the group model or the personalized model.

The method of FIG. 2 further includes running the selected model to determine the recommendation 124 (step 250). For example, if the selected model is the group model, the recommendation manager module 122 runs the group model to determine the recommendation 124. If the selected model is instead the personalized model, the recommendation manager module 122 runs the personalized model to determine the recommendation 124.

Prior to operating the model selection classifier 134 on information associated with a given user, the model selection classifier 134 needs to be trained. In an exemplary embodiment, the model selection classifier 134 is a logistic regression (LogReg) model, a support vector machine (SVM) model, an SVM with linear kernel (SVM-Linear) model, or an SVM with radial basis function as kernel (SVM-RBF) model. In an exemplary embodiment, pairwise interaction features (PIF) are calculated by taking a product of every pair of features (e.g., number of users in the group, time horizon, and similarity measure or metric). In an exemplary embodiment, the SVM-Linear model performs the best when predicting the model to be deployed for a user group when PIF are not used. When PIF are used, the model performance over all metrics improves for LogReg and SVM-Linear as compared to the case where PIF are used.

In an exemplary embodiment, the model selection classifier 134 is trained by running simulations with a varying number of users in a group, a similarity parameter ($\in$), and time horizon (T). For a given one of the simulations, user feature vectors of the group are derived from available user data according to the number of users and the similarity parameter $\in$ chosen to be simulated. For example, if a group of 10 users is being simulated, and the available user data is from 1000 users, then user data of 10 users of the 1000 users are selected according to the similarity parameter $\in$. For example, a similarity parameter $\in=0$ corresponds to most similar users because the similarity parameter $\in$ is a variance factor. Higher values of the similarity parameter $\in$ for a group of users indicate a higher variance in the user preference feature vectors of the group.

The user preference feature vectors may be sampled from a distribution with mean $\mu \in [0,1]^d$ and covariance matrix $\in *I$. Here d is the dimension of the feature space and $\in >= 0$ controls the similarity of users within a group. In an exemplary embodiment, the dimension of the item feature vectors is the same as the dimension of the user preference feature vectors. The mean and covariance matrix dictate the distribution of the user preference feature vectors. In an exemplary embodiment, the user feature vectors are assumed to be coming from a gaussian distribution with a certain mean and variance. The sampling may include picking a point (i.e., a single user feature vector) from the distribution. The input to the sampling may include the mean and covariance matrix, where the covariance matrix is a scaled version of the identity matrix I with scaling factor of $\in$. The covariance matrix is a parameter used to define the gaussian distribution. The output of the sampling is a user preference feature vector of dimension d. The user preference feature vectors may be normalized to ensure a probability distribution. The item feature vectors may be sampled uniformly at random from a binary distribution. As an example, item feature vectors may be generated for L=30 items and a list of K=5 items may be recommended to the user at each time step.

The clicks on the recommended list are simulated to quantify the reward value. The click for an item e by a user u may be sampled from a Bernoulli distribution with mean as $x_e^T \theta_u^*$, where $x_e^T$ is the item feature vector corresponding to the item e and $\theta_u^*$, is the (true) preference vector corresponding to the user u unknown to a Bandit algorithm. Once user feature vectors and item feature vectors are created according to the chosen number of users and similarity parameter $\in$ to simulate, a group model is run for T steps with respect to the created feature vectors and personalized models are run for each of the chosen number of users with respect to the created feature vectors for as many number of time steps as the particular user under consideration gets recommendations from the group model. A group reward is generated each time the group model is run for a given one of the T steps, and a personalized reward is generated each time a given one of the personalized models is run for a given one of the T steps. One of two labels (e.g., G for Group or P for personalized) is given to the data point (e.g., information including the number of users, similarity parameter $\in$, and time horizon T) according to Equation 1 as follow:

$$\text{Label} = \begin{cases} G, \sum_{t=1}^{T} R_t^G \geq \sum_{u \in U} \sum_{t=1}^{T'(u)} R_t^{P(u)} \\ P, \text{ otherwise} \end{cases} \quad \text{[Equation 1]}$$

where, $T = \Sigma_{u \in U} T(u)$ to ensure that the number of feedbacks provided by a user u to the group (G) and the personalized (P(u)) model is same. U is the set of all users, $R_t^G$ refers to the reward from the group model at time step t and $R_t^{P(u)}$ denotes the reward from the personalized model for user u at time step t. The hyper-parameters (number of users in a group, similarity of users in a group $\epsilon$ and time horizon T) for running the simulations are considered as the features for a meta machine learning model.

The running of a model updates parameters of the model (e.g., M and B) when it receives a feedback (e.g., click or no click on the presented item) from the user. When T=3, the model is run 3 times so only 3 users (not necessarily unique) will be presented with the items. In an exemplary embodiment, it is assumed that the probability with which the user will select an item is equal to the dot product of the user preference feature vector and the item feature vector. For example, if this probability is 0.8, and a coin is tossed with chances of a head occurring as 8 out of 10, and the head does occur, it is assumed that the item was selected. However, if the tail instead occurred, it is assumed that the item was not selected. A binary random selector based on the probability may be used to determine whether the item has been selected or not selected. If an item is selected, then the reward for that item can be assumed to be 1 and if the item is not selected, then the reward for that item can be assumed to be 0. So, when a list of 5 items is presented to a user, the maximum reward can be 5 and the minimum reward can be 0. It is possible that different items are presented in different iterations because at each iteration the parameters are being updated based on the feedback of the user. The personalized models are run for the users who were shown items during the simulation of the group model. For example, if user 1 was shown the recommendation in 2 of the 3 iterations (i.e., T=3) and user 5 was shown 1 recommendation, then the personalized model for user 1 is run for 2 iterations and the personalized model for user 5 is run for 1 iteration. If the sum of the rewards for the group model over T iterations for a certain point (i.e., certain number of users, certain similarity, and T) is greater than or equal the sum of the rewards for the personalized models according to the T iterations for the same point, then the point is labeled a 'G' (for the group model), and is otherwise labeled a 'P' (for the personalized model). The above may be repeated for a different point having a different number of users, a different similarity, and a different T In the simulation, essentially, users in a group are presented with two lists of items, one generated from the group model and one generated from their own personalized model. So, if the number of items that the users select from the list generated from the group model is greater than the number of items selected by the users from the personalized models, then the point is labelled as G, and otherwise is labelled as P.

The group model learns a recommendation strategy for all users of the group (e.g., including the given user) from feedback of the group of users and the personalized model learns a personalized recommendation strategy only from feedback of the given user. The feedback may include user impression information and/or click information. The user impression information may indicate a degree of interest of the user in a given item (e.g., an article, a movie, etc.) that is being recommended. The click information may indicate whether a user selected a given item that was recommended.

The selected model is used to perform an estimation based on features that represent the digital content 118 and the user interaction data 114 as a linear function in order to generate the recommendation. As part of this, the recommendation manager module 112 generates an unknown coefficient vector Θ, which describes a linear relationship between a feature vector and a reward, which is the effectiveness in achieving the desired user interactions. In other words, the feature vector is a linear function of the rewards through the unknown coefficient vector Θ.

To generate the recommendation 124, the recommendation manager module 122 is configured to address a tradeoff between exploration and exploitation. In exploration, the recommendation of digital content 118 is generated to improve knowledge about the linear relationship between the feature vector and the reward. In exploitation, the recommendation 124 of digital content 118 is generated to maximize effectiveness in achieving the desired user interaction. This tradeoff involves balancing a goal of generating the recommendation 124 of digital content 118 that is most effective and determining which recommendation 124 of digital content 118 is most effective. Thus, in some instances it may be desirable to generate a recommendation 124 for sub-optimal digital content 118 (i.e., is less effective) to learn more about the linear relationship between the feature vector and the reward and thus increase a likelihood of accuracy of the recommendation 124.

The linear models 128 may not be capable of generating perfect recommendations 124 as a result of randomness, because an observed reward might not be an exact linear function of the features (i.e., includes an unpredictable component). To address this, the recommendation manager module 122 may be configured to generate a noise estimate (e.g., a noise variance estimate $\sigma^2$) and a confidence interval (e.g., a confidence radius factor $\alpha$) of that noise estimate for use as part of a linear stochastic bandits' technique. The confidence interval indicates an amount of uncertainty of the noise estimate.

In an exemplary embodiment, the recommendation manager module 122 employs a linear stochastic bandit technique that is based on confidence intervals of a reward that is to be obtained by making a recommendation 124. To do so, the recommendation manager module 122, at any point in time, selects a choice from a number of choices (e.g., items of digital content 118) using the selected model (e.g., a group or personalized model) that is fit to user interaction data 110 to describe past user interactions. This is used to obtain an estimate of what the reward would be for each of the items of digital content 118. These estimates are then used to generate the recommendation 124, which may also take into account exploration and exploitation. For these choices to be meaningful, the confidence interval is used to describe an amount of uncertainty in making the noise estimate.

Thus, the confidence interval and noise estimate define a confidence interval for the reward for each of the items of digital content 118. This enables the recommendation manager module 122 to generate the recommendation 124 as choosing which of the items has the highest upper bound in the reward of its confidence interval. As a result, the recommendation manager module 122 may make the most optimistic choice by looking at each option (i.e., item of digital content 118) and optimistically choose the one that has the highest potential of yielding a high reward. As that option is chosen, the reward is obtained and added to the user interaction data 110 to guide subsequent recommendation 124 generation.

Figure 3:
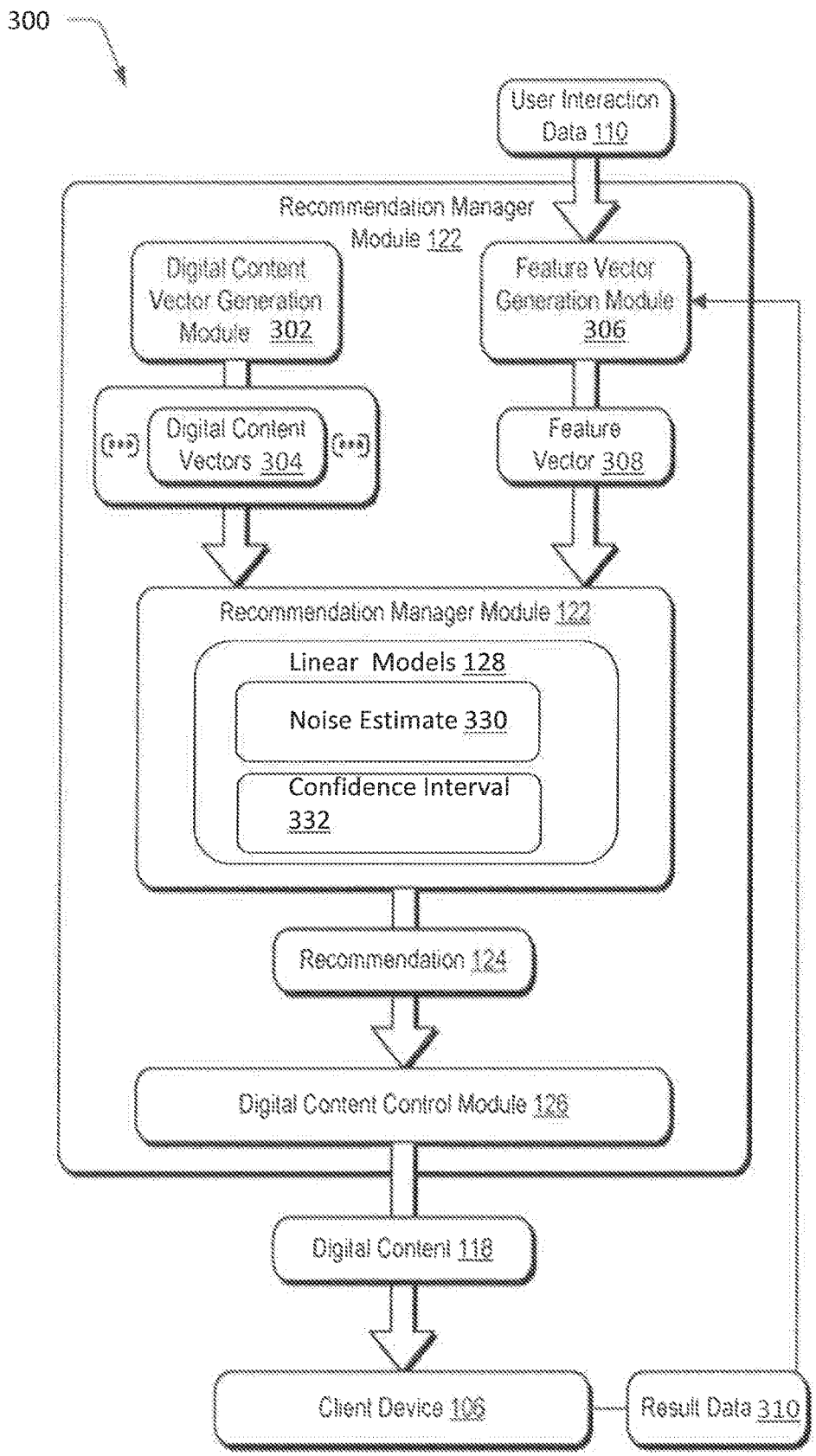
FIG. 3 illustrates the recommendation system updating its recommendation models according to an exemplary embodiment of the disclosure.

FIG. 3 depicts a system 300 showing operation of the recommendation manager module 122 of FIG. 1 in greater detail. In this example, the recommendation manager module 122 includes a digital content vector generation module 302 that is configured to generate digital content vectors 304 that represent digital content 118 that is to be subject of the recommendation 124. For example, suppose the digital content 118 includes a plurality of digital articles and the recommendation 124 describes which article is to be transmitted for display by the client device 106. The digital content vector generation module 302 is configured to generate the digital content vectors 304 having elements that reference characteristics of the article, e.g., a vector of one hundred elements in which the first element indicates how related the article is to sports, the second element indicates how related the article is to politics, etc. As a result, the digital content vectors 304 support numerical data in which each element has meaning in describing the digital content. Likewise, a feature vector generation module 306 is implemented to generate a feature vector 308 as a numerical representation of features of the user interaction data 110, e.g., to describe user interactions such as which interaction did or did not occur in relation to which items of digital content.

The digital content vectors 304 and feature vector 308 are then employed by the recommendation manager module 122 to generate each of the linear models 128 through linear regression. As part of this, a noise estimate 330 is generated along with a confidence interval 332 describing an amount of uncertainty for each of the items of digital content in causing a desired user interaction (e.g., selection of an article). The noise estimate 330, for instance, may be generated based on a mean square distance between an estimate of the reward and the actual rewards observed in the result data 310. Thus, the recommendation manager module 122 computes a likely "reward" for each of the items of digital content 118 and generates the recommendation 124 based on an amount of certainty of a noise estimate 330.

The recommendation manager module 122, for instance, may determine that an amount of uncertainty as defined by a noise estimate 330 for an item of digital content 118 is low. Thus, under exploitation, the recommendation manager module 122 generates a recommendation 124 to cause the digital content control module 126 to expose that item of digital content 118 to the client device 106. In another instance, however, a confidence interval 332 for a noise estimate 330 may indicate a high level of uncertainty (e.g., over a threshold amount), thereby causing the recommendation manager module 122 to select a sub-optimal exploitation option in order to gain insight into the linear relationship through exploration.

Result data 310 indicating a result of the exposure of the digital content 118 to the client device 106 is then added to the user interaction data 110 and the feature vector 308 to refine the selected linear model, the noise estimate 330, and the confidence interval 332. Thus, a next recommendation 124 may be generated based on how the user of the client device 106 responds to a previous recommendation. In this way, the recommendation manager module 122 may improve accuracy of the selected linear model, the noise estimate 330, and the confidence interval 232 over time and thus improve accuracy of the recommendation 124.

FIG. 4 illustrates a multi-armed bandit algorithm for updating either the personalized model based on feedback from a given user or the group model based on feedback from a group of users including the given user, according to an exemplary embodiment of the disclosure. The inputs to the algorithm (see line 1) include a set of L items E, the dimension of a feature space d, a noise variation estimate $\sigma^2$, a confidence radius factor $\alpha$, and a returning user U(t) at time t. For example, the returning user U(t) is being presented either the personalized model or the group model. The dimension d is the same as the number of components in an item feature vector that is derived from the L items E. For example, if the item feature vector represents the category of an item (e.g., a movie), and there are 5 categories in total (e.g., comedy, drama, action, horror, and romance), and the movie belongs to comedy, drama, and action, then the item feature vector will have 3 1's and 2 0's in the vector dimension of 5. The noise variation estimate $\sigma^2$ and the confidence radius factor $\alpha$ are hyperparameters of the algorithm, and may be initially set to 1 as an example. An initialization step of the algorithm (see line 2) initializes a gram matrix $M_0$ and a feedback matric $B_0$. These matrices facilitate linear regression in an online fashion, that is, model parameters are updated incrementally as feedback arrives in each iteration. Line 4 of the algorithm can be interpreted as performing a linear regression to get an estimate of a user preference vector. An upper confidence bound (UCB) is calculated for each item in the set E, and then the top K items based on their UCBs are greedily selected. The K items may be placed into a recommendation list (e.g., Recommendation 124). In lines 3-6 of the algorithm, user U(t) is presented with the K items, and the item with the maximum UCB term is found greedily. In line 7 of the algorithm, $A_t$ is the list with the top K items and $C_t$ is either 1 or 0 for each item clicked or not clicked, respectively. In lines 8-9 of the algorithm, the matrices are updated with the feature vector of the item $(X_e)$ recommended at position k (recommended list is an ordered list). In the case of the group model, the recommendation list is presented to a randomly selected user U(t) at each time step t and feedback from that user updates the model parameters (lines 8-9 of the algorithm). In the case of the personalized model, a single user is presented with the recommendation list at each time step t and model parameters are updated only from the feedback of that user. In an exemplary embodiment, a full observation click model is considered where the user scans the recommendation list from beginning to end, and clicks on zero or more items.

Figure 5:
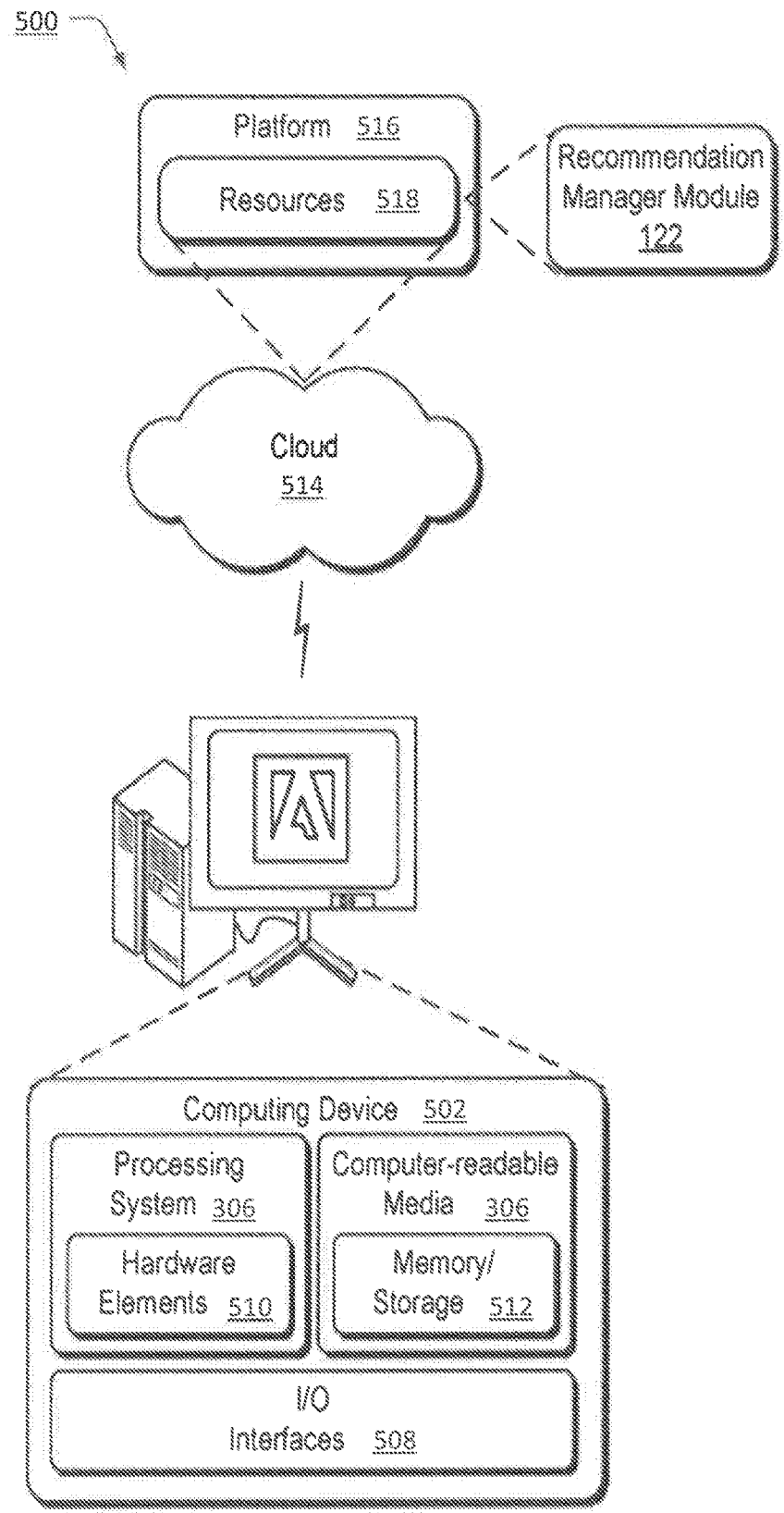
FIG. 5 illustrates an exemplary computing device that may be used to perform one or more methods of the disclosure.

FIG. 5 illustrates an example system 500 that includes an example computing device 502 that is representative of one or more computing systems and/or devices that may implement the various techniques described herein. This is illustrated through inclusion of the recommendation manager module 122. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 616 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

As discussed above, according to an exemplary embodiment of the disclosure, a method is provided for recommending digital content to a given user that relies on the presence of a group model associated with a group of users including the given user and a personalized model associated with the given user. In an exemplary embodiment, the group model is learned from feedback of the users of the group with respect to a plurality of items and the personalized model is only learned from feedback of the given user with respect to the plurality of items. In an exemplary embodiment, the feedback indicates whether a given one of the items has been selected or not selected by each of the users. In an exemplary embodiment, the plurality of items are digital movies or digital articles. In an exemplary embodiment, the personalized model and the group model are each a multi-armed bandit algorithm. In an exemplary embodiment, the personalized model and the group model are each a support vector machine or a logistic regression. As discussed above, the method relies on a time horizon associated with the given user. In an exemplary embodiment, a value of the time horizon increases as a number of interactions of the given user with the selected model increases. As discussed above, the method selects one of the group and personalized models, and runs the selected model to determine the digital content to recommend. In an exemplary embodiment, running the selected model includes calculating an upper confidence bound (UCB) for each of L items of the plurality based on the corresponding feedback; and greedily selecting a top K items from the L items based on the UCBs, where the digital content includes the K items and K is less than or equal to L. As discussed above, the method includes applying information including a number of users, a similarity of the users, and a time domain to a model selection classifier.

In an exemplary embodiment, the model selection classifier is trained by: generating a sample including a number of sample users, a sample similarity of the sample users, and a number of iterations I; simulating the number of sample users from a plurality of user preferences and the sample similarity; for each of I users of the sample users, simulating the corresponding user selecting zero or more items from a plurality of sample items suggested by a sample group model, and determining a group reward for the corresponding user based on the corresponding selection; for each of the I users, simulating the corresponding user selecting zero or more items from the sample items suggested by a sample personalized model, and determining a personalized reward for the corresponding user based on the corresponding selection; and labelling the sample with a label representative of the group model when a sum of the group rewards is greater than or equal a sum of the personalized rewards, and otherwise labelling the simulated sample with a label representative of the personalized model. In an exemplary embodiment, the number of sample users, the sample similarity, and the number of iterations I are generated randomly or through expert knowledge, and the prior steps of the present paragraph are repeated at least once to complete a training of the model selection classifier. In an exemplary embodiment, the simulating according to a given one of the sample models includes: for each sample item, determining a probability from a dot product of an item feature vector of the corresponding sample item and a user feature vector of one of the T users; and using a binary random selector based on the probabilities to select zero or more items from the sample items suggested by given sample model.

As discussed above, according to an exemplary embodiment of the disclosure, a training system for training a recommendation system is provided. For example, the service provider system 102 may train the learning agent and deploy the learning agent across network 108 to the recommendation system 104. In an exemplary embodiment, the training of the learning agent includes: generating a sample indicating a simulated number of users, a simulated similarity, and a simulated time horizon T; simulating the simulated number of users from a plurality of user preferences and the simulated similarity; creating a simulated group model for the simulated users based on item features of a plurality of sample items and the user preferences; for each of the simulated users, creating a simulated personalized model based on the item features and the user preferences of the corresponding user; for each of T users of the simulated users, simulating the corresponding user selecting a subset (e.g., 0 or more) of the sample items suggested by the simulated group model, and determining a group reward for the corresponding user based on the corresponding selection; for each of the T users, simulating the corresponding user selecting on a subset (e.g., 0 or more) of the sample items suggested by the corresponding simulated personalized model, and determining a personalized reward for the corresponding user based on the corresponding selection; and labelling the sample with a label representative of the group model when a sum of the group rewards is greater than or equal a sum of the personalized rewards, and otherwise labelling the sample with a label representative of the personalized model. In an exemplary embodiment, the simulating of a simulated user among the T users selecting on the subset of items includes for each item of the subset, determining a probability from a dot product of an item feature vector of the corresponding item and a user feature vector of the simulated user, and using a binary random selector based on the probability to select items of the subset. In an exemplary embodiment, the recommendation system (e.g., 104) maintains the group model and the personalized model, the group model learned from feedback of the users with respect to a plurality of items and the personalized model learned only from feedback of the given user with respect to the plurality of items.

As discussed above, according to an exemplary embodiment of the disclosure, a computer program product for training a model selection classifier to choose between selecting a group model and a personalized model for recommending digital content is provided. Further, as discussed above, the training includes simulating a corresponding user selecting a subset of items. In an exemplary embodiment, the simulating of a given user among the users selecting the subset of items suggested by a given one of the simulated models includes: for each corresponding item suggested by the given simulated model, determining a probability from a dot product of an item feature vector of the corresponding item and a user feature vector of the given user, choosing between a first value and a second other value according to the probability, simulating the given user selecting the corresponding item when the first value is chosen and otherwise simulating the given user not selecting the corresponding user when the second value is chosen.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A computer-implemented method for recommending digital content by a recommendation system, the method comprising:
   determining, by a processor, user preferences of a given user and a time horizon indicating how familiar the recommendation system is with the given user;
   determining, by the processor, a group for the given user based on the determined user preferences;
   determining, by the processor, a number of users of the determined group and a similarity of the given user to the determined group;
   applying, by the processor, the number of users, the similarity, and the time horizon to a model selection classifier to select one of a personalized model of the given user and a group model of the determined group; and
   running, by the processor, the selected model to determine digital content to recommend to the given user,
   wherein prior to the running, the processor trains the model selection classifier by:
   generating a sample comprising a number of sample users and a number of iterations I;
   for each of I users of the sample users, simulating the corresponding sample user selecting zero or more items from a part of the digital content suggested by the group model to determine a group reward;
   for each of the I users, simulating the corresponding sample user selecting zero or more items from a part of the digital content suggested by the personalized model to determine a personalized reward; and
   labeling the sample to indicate the group model when a sum of the group rewards is greater than or equal to a sum of the personalized rewards, and otherwise labeling the sample to indicate the personalized model.

2. The computer-implemented method of claim 1, wherein the group model is learned from feedback of the users of the determined with respect to a plurality of items and the personalized model is only learned from feedback of the given user with respect to the plurality of items.

3. The computer-implemented method of claim 2, where the feedback indicates whether a given one of the plurality of items has been selected or not selected.

4. The computer-implemented method of claim 2, wherein the plurality of items are digital movies or digital articles.

5. The computer-implemented method of claim 2, wherein a value of the time horizon increases as a number of interactions of the given user with the selected model increases.

6. The computer-implemented method of claim 2, wherein running the selected model comprises:
calculating an upper confidence bound (UCB) for each of L items of the plurality of items based on the corresponding feedback; and
greedily selecting a top K items from the L items based on the UCBs,
wherein the digital content includes the K items and K is less than or equal to L.

7. The computer-implemented method of claim 1, wherein the personalized model and the group model are each a multi-armed bandit algorithm.

8. The computer-implemented method of claim 1, wherein the sample further comprises a sample similarity of the sample users.

9. The computer-implemented method of claim 8, wherein the number of sample users, the sample similarity, and the number of iterations I are generated randomly.

10. The computer-implemented method of claim 1, wherein the simulating based on a given model among the personalized model and the group model comprises:
for each item of the digital content, determining a probability from a dot product of an item feature vector of the corresponding item and a user feature vector of one of the I users; and
using a binary random selector based on the probabilities to select the zero or more items from the part suggested by the given model.

11. A training system for training a recommendation system, comprising:
a memory storing a computer program for training a learning agent and deploying the learning agent to the recommendation system;
a network interface for communicating with a computer network; and
a processor configured to execute the computer program, wherein the computer program is configured to train the learning agent to select between a group model for a given user and a personalized model for the given user based on a number of first users of a group associated with the given user, a similarity of the given user to the group, and a time horizon indicating how familiar the recommendation system is with the given user to recommend digital content, and
wherein the computer program is further configured to output the learning agent across the computer network to a device housing the recommendation system,
wherein the computer program trains the learning agent by:
generating a sample comprising a number of sample users and a number of iterations I;
for each of I users of the sample users, simulating the corresponding sample user selecting zero or more items from a part of the digital content suggested by the group model to determine a group reward;
for each of the I users, simulating the corresponding sample user selecting zero or more items from a part of the digital content suggested by the personalized model to determine a personalized reward; and
labeling the sample to indicate the group model when a sum of the group rewards is greater than or equal to a sum of the personalized rewards, and otherwise labeling the sample to indicate the personalized model.

12. The training system of claim 11, wherein the sample further comprises a simulated similarity of the sample users.

13. The training system of claim 11, wherein the simulating based on a given model among the personalized model and the group model comprises:
for each item of the digital content, determining a probability from a dot product of an item feature vector of the corresponding item and a user feature vector of one of the I users and using a binary random selector based on the probabilities to select the zero or more items from the part suggested by the given model.

14. The training system of claim 11, wherein the recommendation system maintains the group model and the personalized model, the group model learned from feedback of the users with respect to a plurality of items and the personalized model learned only from feedback of the given user with respect to the plurality of items.

15. The training system of claim 14, where the feedback indicates whether a given one of the items has been selected or not selected.

16. A computer program product for training a model selection classifier to choose between selecting a group model and a personalized model for recommending digital content, the computer program product being tangibly embodied on a non-transitory computer-readable storage medium and comprising instructions that, when executed by at least one computing device, are configured to cause the at least one computing device to:
generate a sample comprising a number of sample users and a number of iterations I;
for each of I users of the sample users, simulate the corresponding sample user selecting zero or more items from a part of the digital content suggested by the group model to determine a group reward;
for each of the I users, simulate the corresponding sample user selecting zero or more items from a part of the digital content suggested by the personalized model to determine a personalized reward; and
label the sample to indicate the group model when a sum of the group rewards is greater than or equal to a sum of the personalized rewards, and otherwise label the sample to indicate the personalized model,
wherein application of a number of users of a group associated with a given user, a similarity of the given user to the group, and a time horizon indicating how familiar a recommendation system is with the given user to the model selection classifier causes selection of one of the group model and the personalized model to recommend of at least one item of the digital content.

17. The computer program product of claim 16, wherein the simulate based on a given model among the personalized model and the group model for a given user comprises:
for each corresponding item suggested by the given model, determining a probability from a dot product of an item feature vector of the corresponding item and a user feature vector of the given user, choosing between a first value and a second other value according to the probability, simulating the given user selecting the corresponding item when the first value is chosen and otherwise simulating the given user not selecting the corresponding user.

18. The computer program product of claim 16, wherein the group model is learned from feedback of a plurality of second users with respect to a plurality of second items and the personalized model is only learned from feedback of a single user of the second users with respect to the plurality of second items.

19. The computer program product of claim 16, wherein the personalized model and the group model are each a multi-armed bandit algorithm.

20. The computer program product of claim 16, wherein the group model is generated for the number of sample users, and the personalized model is generated for each user of the number of sample users.

\* \* \* \* \*